INVENTORS
RICHARD TAYLOR
DONALD K. REX
HARRY C. KUNTZLEMAN

INVENTORS
RICHARD TAYLOR
DONALD K. REX
HARRY C. KUNTZLEMAN

ATTORNEY

INVENTORS
RICHARD TAYLOR
DONALD K. REX
HARRY C. KUNTZLEMAN
BY
ATTORNEY

Aug. 12, 1958 R. TAYLOR ET AL 2,847,008
BLOOD HANDLING SYSTEM FOR EXTRACORPOREAL
CIRCULATION DEVICES
Filed Nov. 14, 1955 5 Sheets-Sheet 4

INVENTORS
RICHARD TAYLOR
DONALD K. REX
HARRY C. KUNTZLEMAN
BY
ATTORNEY

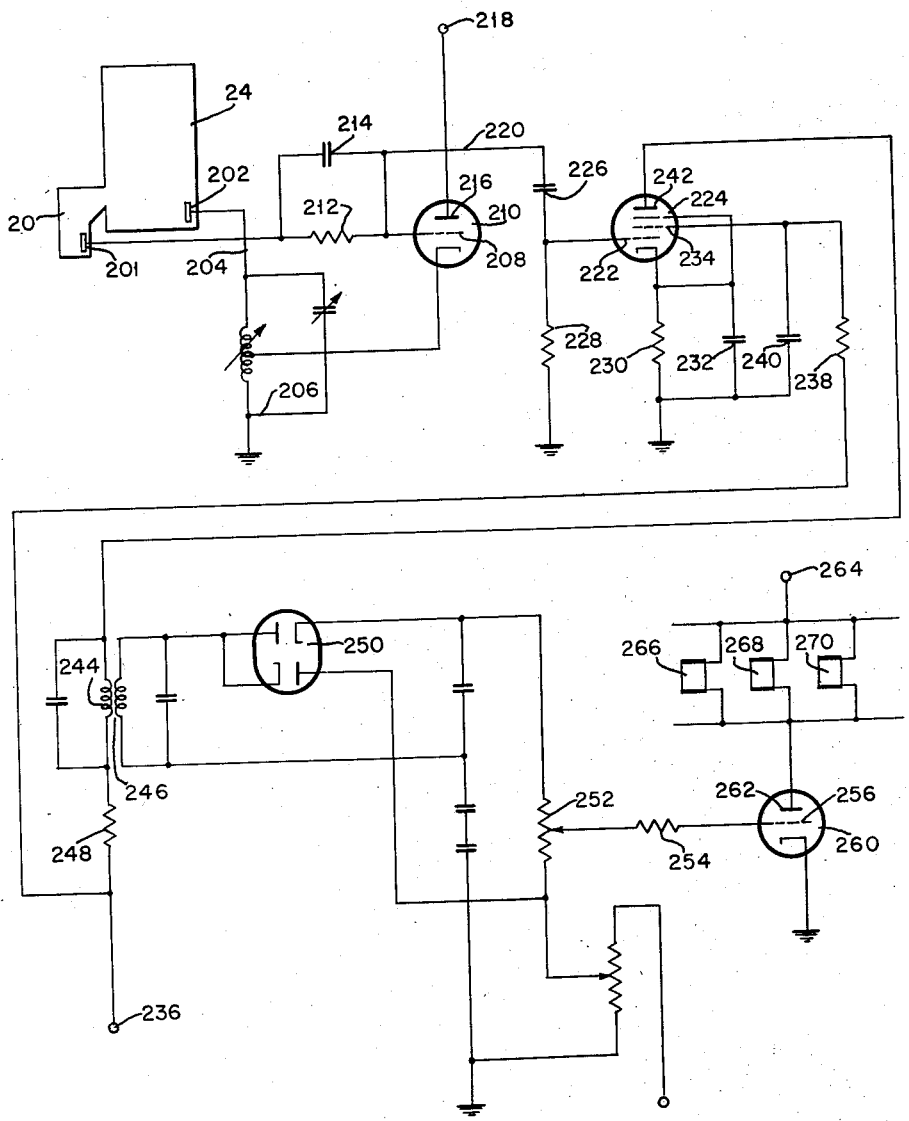

United States Patent Office 2,847,008
Patented Aug. 12, 1958

2,847,008

BLOOD HANDLING SYSTEM FOR EXTRA-CORPOREAL CIRCULATION DEVICES

Richard Taylor, Binghamton, Donald K. Rex, Endicott, and Harry C. Kuntzleman, Newark Valley, N. Y., assignors, by direct and mesne assignments, to Research Corporation, New York, N. Y., a corporation of New York Application November 14, 1955, Serial No. 546,724

4 Claims. (Cl. 128—214)

This invention relates to extracorporeal circulation devices and particularly to an improved blood-handling system adapted for use in such devices.

The subject matter of this invention is primarily in the nature of an improvement on the blood-pumping system described in U. S. Patent 2,705,493, issued April 5, 1955, to Malmros et al.

As set forth in more detail in the above-identified patent, the introduction of oxygen into venous blood, and the accompanying removal of carbon dioxide therefrom in a mechanical device adapted to provide a functional replacement for the heart and lungs of a human being is a problem beset by many difficulties.

Most previous extracorporeal circulation devices have not been adapted to provide for continuous operation at an optimum oxygenating rate, which when determined for a particular subject or patient should desirably remain relatively unaffected by changing conditions during operation of the device. The present invention provides a construction in which the blood oxygenating unit may be set at an optimum oxygenation rate determined by the known requirements of the subject and the contemplated surgical procedure, and in which the rate of oxygenation will remain substantially unaffected despite variations in physiological conditions during operation of the unit. In the portions of the specification that follow it is to be understood that the term "optimum" is intended to mean the most suitable operating conditions for the device for a given patient and a given surgical procedure.

In addition to the desired maintenance of a predetermined oxygenating rate, it is also desirable to carefully maintain an equality between the rate of withdrawal of venous blood from the subject and the rate of return of oxygenated blood thereto so as to maintain a constancy of blood volume within the subject or source thereof. With previous machines the rate of venous blood withdrawal and return of oxygenated blood return is appreciably different from the optimum rate of blood flow through the venous blood oxygenating unit. Among the advantages attendant the use of the invention herein disclosed is the ready attainment of the optimum rate of blood flow through the oxygenating unit and satisfaction of the requirement of continued equality between the rate of venous blood withdrawal and oxygenated blood return to the subject or source thereof.

This invention may be briefly described as an improved blood handling system for extracorporeal circulation devices which includes provision and utilization of an auxiliary blood-receiving chamber adapted for connection to a blood oxygenating unit to receive the overflow from a constant volume oxygenated blood pool therein as well as the venous blood delivered from the subject or source thereof, together with associated pumping means adapted to circulate predetermined amounts of blood from said auxiliary blood receiving chamber through the blood oxygenating unit at a predetermined constant rate, and to thereby permit operation of said blood oxygenating unit at or near optimum oxygenation efficiency, and an automatic control system to maintain the desired equality between said rates of blood withdrawal and return.

The primary object of this invention is the provision of an improved blood handling system for extracorporeal circulation devices.

Another object of this invention is the provision of an auxiliary blood receiving chamber adapted for connection to a blood oxygenating unit to receive the overflow from a constant volume oxygenated blood pool therein as well as the venous blood withdrawn from the subject or source thereof.

Another object of this invention is the provision of an improved pumping system for extracorporeal circulation devices which assures maintenance of equality between the rates of venous blood withdrawal and oxygenated blood return and additionally permits maintenance of a rate of blood flow through an oxygenating unit that permits operation thereof at or near optimum oxygenation efficiency.

Other objects and advantages of this invention will be pointed out in the following disclosure and claims, and illustrated in the accompanying drawings which disclose, by way of example, the principles of the invention and the presently preferred embodiment of a blood handling system incorporating those principles.

Referring to the drawings:

Fig. 10 is a circuit diagram of an automatic control circuit adapted to halt operation of the oxygenated blood pump if the blood level within the blood oxygenating unit or the auxiliary blood receiving chamber falls below a predetermined level.

Figure 1:
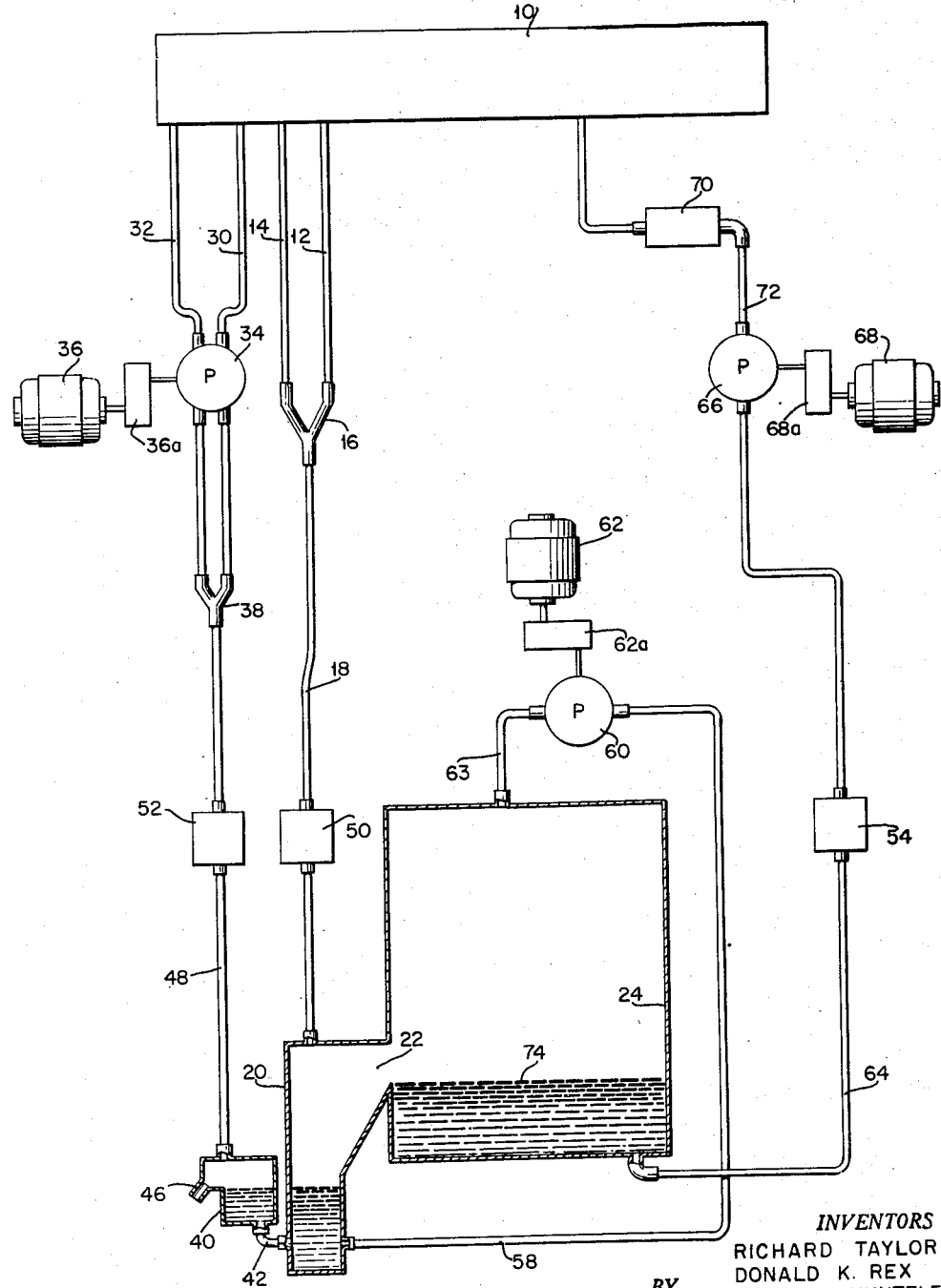
Fig. 1 is a schematic diagram of the improved blood handling system forming the subject matter of this invention.
Figure 3:
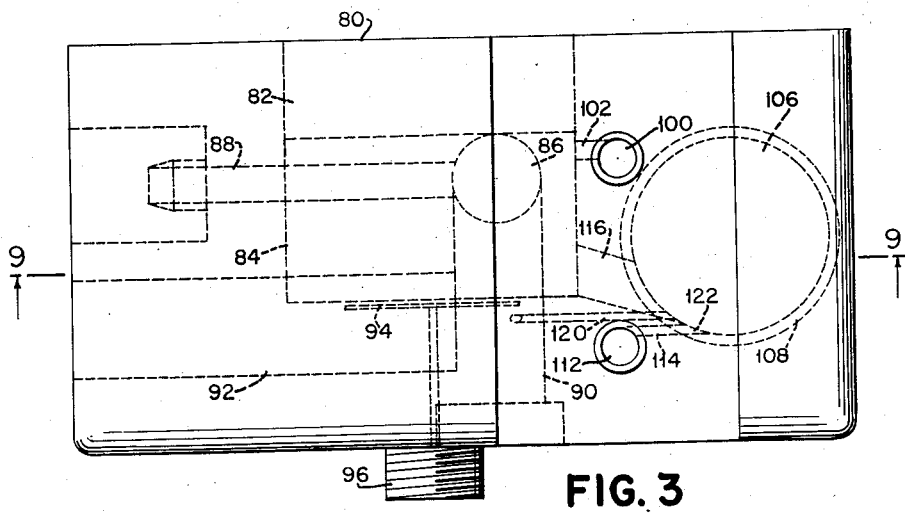
Fig. 3 is a plan view of the presently preferred embodiment of the auxiliary blood receiving chamber.
Figure 4:
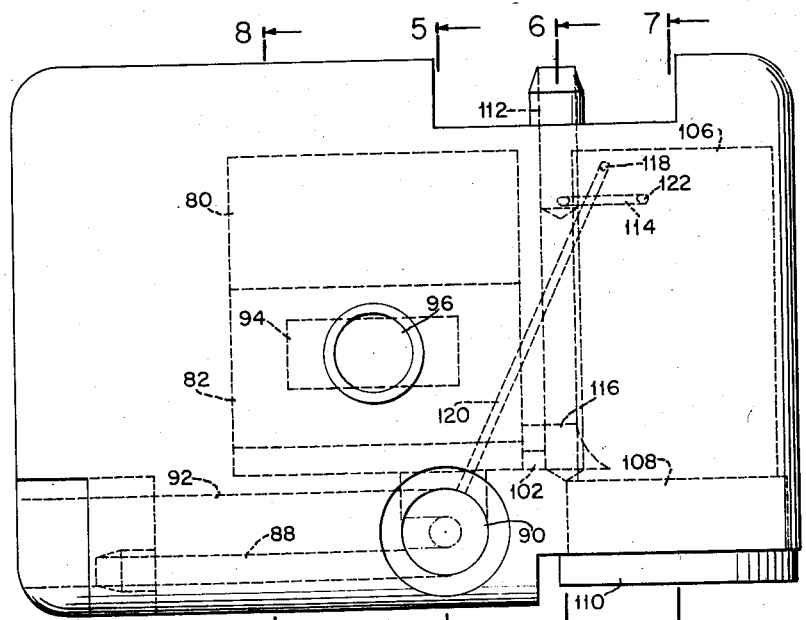
Fig. 4 is a side elevational view of the auxiliary chamber illustrated at Fig. 3.
Figure 5:
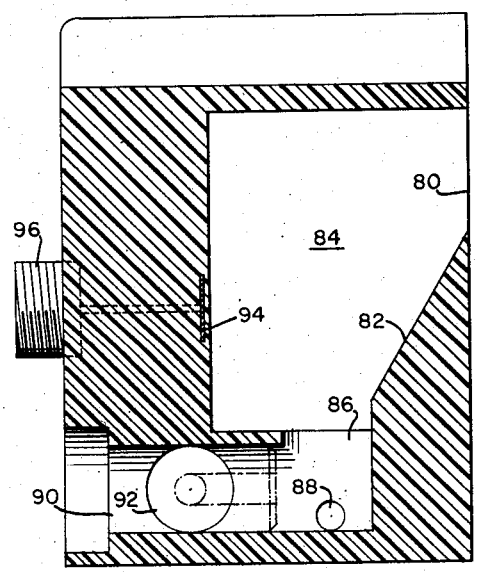
Figs. 5-8 are sectional views on the lines 5—5, 6—6, 7—7, and 8—8 respectively of Fig. 4.
Figure 6:
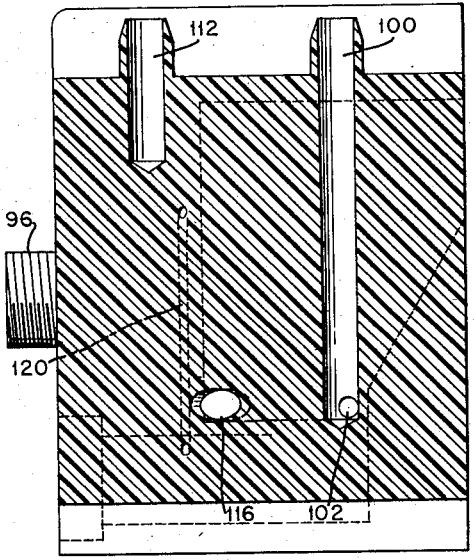
Figure 7:
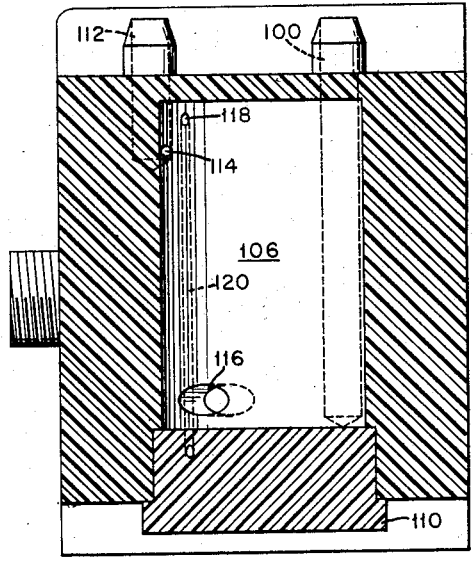
Figure 8:
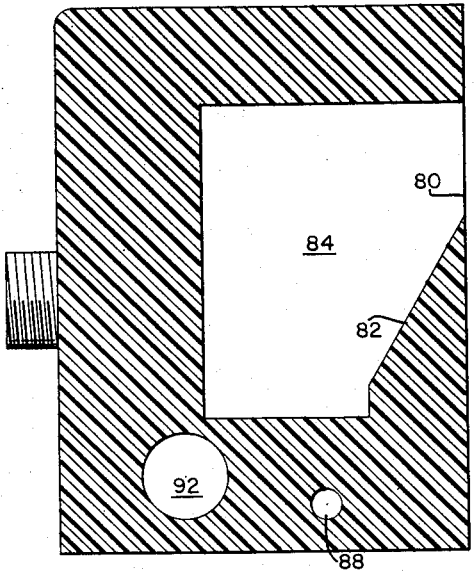
Figure 9:
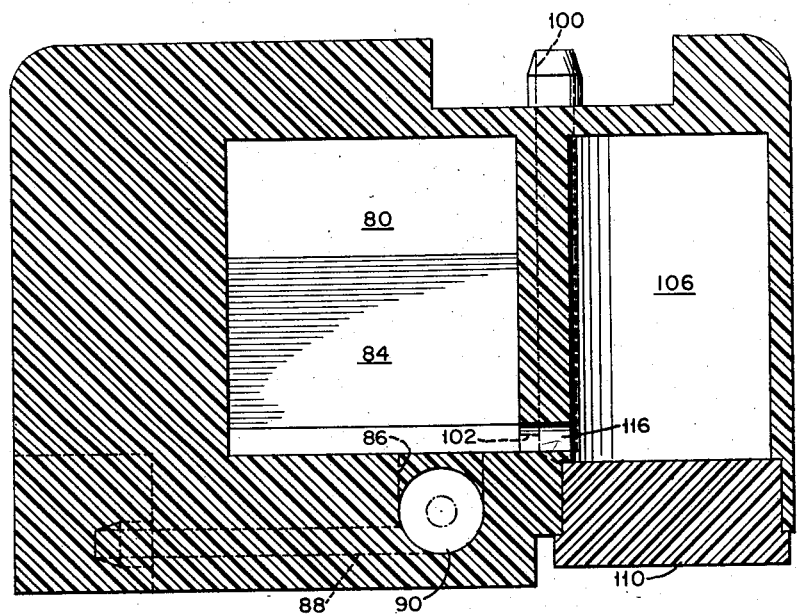
Fig. 9 is a sectional view on the line 9—9 of Fig. 3.

Referring to the drawings, and particularly to Fig. 1, a source of venous blood such as a subject or patient to be treated is schematically designated as 10. Venous blood is adapted to be taken from the subject's circulatory system through suitable cannulae connected to a pair of tubes 12 and 14 respectively. The tubes 12, 14 are connected through a suitable Y-joint 16 to a common and main venous blood input tube or line 18. The main venous blood input line 18 is directly connected to an auxiliary blood receiving chamber generally designated 20. The auxiliary blood receiving chamber 20 is mounted adjacent to the lower portion of a blood oxygenating unit generally designated 24 and is disposed in fluid communication with an oxygenated blood overflow aperture 22 therein.

In addition to the main venous blood input lines 12 and 14 two additional blood receiving tubes 30 and 32 are provided. The tube 30 is adapted to be suitably inserted into the subject's left ventricle to withdraw blood from that chamber of the heart. The second tube 32 is adapted to be used to remove any blood which may ooze into the chest cavity during the operation. The blood input lines 30 and 32 are connected to the input side of an auxiliary pump 34 arranged to be driven by an electric motor 36 through a suitable gear reduction unit 36a. The auxiliary pump 34 (as well as the recirculation and arterial blood pumps which will be subsequently described) are all modified De Bakey pumps as generally described in U. S. Patents 2,018,998 and 2,018,999. As no claim of novelty is directed towards the pumps per se, no further description thereof will be made in this application and reference should be made to the above-identified patents for the constructional details thereof. The speed of the auxiliary pump 34 is adapted to be manually set to accommodate the particular set of operating conditions. The speed setting, however, may not satisfy the needs of both the lines 30 and 32. In such case, the auxiliary pump 34 may be preset to handle the higher of the two volumes and the pumping rate of the second line may preferably be inhibited by occluding it with an adjustable clamp.

The tubes 30 and 32, on the exit side of the auxiliary pump 34 are joined, by means of a suitable Y-connector 38, to form a common blood input tube or line 48. The common input line 48 is connected to a blood defoaming chamber 40 associated with said auxiliary blood receiving chamber 20. The blood discharged from the auxiliary pump 34 will usually contain air which must of course be kept out of the main blood circulation system for the extracorporeal circulation device and the defoaming chamber 40 serves to separate the liquid blood from any air or foam. In operation of the unit the intermixed liquid blood and foam flowing into the defoaming chamber 40 is gravity separated with the liquid blood settling and the foam floating on the surface thereof. The defoaming chamber 40 is positioned relative to the auxiliary blood receiving chamber 20 so that the normal level of blood in said chamber 20 maintains a sufficient level of liquid blood within the defoaming chamber 40 so as to maintain a liquid blood seal for the connecting passage 42 therebetween. In addition thereto, the defoaming chamber 40 is provided with a foam overflow vent 46 disposed in the upper portion thereof which permits overflow of excess blood foam externally of the main blood circuit of the extracorporeal circulation device.

Blood collected in the auxiliary blood receiving chamber 20 is removed by means of tube 58 connected to the lower portion thereof. The tube 58 is directly connected to the input side of the recirculation pump 60 arranged to be driven by a suitable electric motor 62 through a suitable gear reducer 62a. The output side of recirculation pump 60 is connected by means of tubing 63 to the blood inlet locality of the blood oxygenating unit 24 wherein the blood flows downwardly over a plurality of suitable screens of conventional arrangement (not shown) and gives up carbon dioxide and picks up oxygen and the oxygenated blood is collected in the lower portion of said unit 24. The recirculation pump 60 thus serves to circulate blood from said auxiliary blood receiving chamber 20 through the blood oxygenating unit 24 and in so doing, recirculates, if necessary, any of the already oxygenated blood that entered said auxiliary blood receiving chamber 20 by means of the overflow aperture 22 in said blood oxygenating unit 24. The speed of the recirculation pump 64 is preset at a predetermined value so as to maintain a rate of blood flow through the oxygenating unit 24 that assures operation of said unit at or near maximum oxygenation efficiency. In operation of the unit, a pool of oxygenated blood designated 74 will collect in the bottom of the blood oxygenating unit 24 and will have a maximum depth determined by the height of the overflow aperture 22 from the base of the unit. Any excess of oxygenated blood will flow through the overflow aperture 22 and into the auxiliary chamber 20 in which it will be mixed with venous blood entering therein directly from the subject.

Oxygenated blood is removed from the oxygenated blood pool 74 in the blood oxygenating unit 24 by means of the oxygenated blood outlet tube 64, the other end of which is connected to the input side of the arterial or oxygenated blood pump 66. The arterial blood pump 66 is arranged to be driven by a suitable electric motor 68 through a gear reduction unit 68a. The output side of the arterial blood pump 66 is reconnected to the subject or source 10 by means of tube 72 which includes a fine mesh filter 70 serving to trap any solid particles or air bubbles that are entrained in the oxygenated blood and thereby prevent the introduction thereof to the subject or blood source.

As shown on the drawing, there are preferably included suitable syringe connectors 50, 52 and 54 in the venous and oxygenated blood lines 18, 48 and 64 respectively. These syringe connectors which are of conventional construction facilitate the taking of blood samples if such is desired or necessary, and also readily permit the scavaging of air from the venous blood lines to facilitate the initiation of blood flow from the subject or source 10 at the commencement of machine use.

Figs. 3, 4 and 5 through 9 illustrate the details of the presently preferred embodiment of the auxiliary blood receiving chamber 20 and blood defoaming unit 40. There is provided an oxygenated blood entry aperture 80 adapted for direct or remote connection to the oxygenated blood overflow aperture 22 in the blood oxygenating unit 24. The entering oxygenated blood flows down an inclined spillway 82 defining one wall of an enlarged chamber 84. The chamber 84 is substantially rectangular in shape and is provided with a circular blood exit aperture 86 disposed at the base thereof. The blood exit aperture 86 provides a fluid connection intermediate the interior of the chamber 84 and the blood outlet passage 88 to which the tube 58 (see Fig. 1) is adapted to be connected. The blood exit aperture 86 also serves to connect the interior of the chamber 84 with the saline solution exit port 92. As shown in the drawings, the enlarged saline exit port 92 terminates in a valve seat 90 adapted to contain a manually rotatable valve for rapidly sealing the saline port 92 from the interior of the chamber 84 subsequent to the saline flushing and priming operation.

Included in one of the sidewalls defining the chamber 84 and separated from the interior of the chamber 84 by a suitable thickness of material serving as a dielectric medium is a metal plate member 94. The plate member 94 serves as one electrode of a capacitor and provides a control function that will later be described in detail. The plate 94 is electrically connected to suitable external connector 96 mounted on the exterior surface of the unit.

Venous blood from the common and main venous blood input line or tube 18 (Fig. 1) enters the auxiliary blood receiving chamber 84 through the vertically disposed passage 100. The passage 100 terminates adjacent the floor of the chamber 84 and is fluidly connected thereto by means of the small horizontally disposed passage 102.

In operation of the above described unit, any overflow of oxygenated blood from the blood oxygenating unit 24 enters the chamber 84 by means of the oxygenated blood entry aperture 80 and venous blood from the subject or source 10 enters by means of the vertically disposed passage 100. Blood is removed from the unit through the blood outlet passage 88 under the action of the recirculation pump 60.

As mentioned earlier, a defoaming chamber 40 is associated with the auxiliary blood receiving chamber 20 to prereceive blood directly from the subject's left ventricle and any blood that may ooze into the chest cavity. Referring again to Figs. 3, 4 and 5–9, there is provided a cylindrical defoaming chamber 106 having an enlarged aperture 108 at the base thereof that is adapted to be sealed subsequent to sterilization operation by a suitable plug schematically designated 110. Blood from the entry tube 48 enters the top of the defoaming chamber 106 by means of the vertically disposed blood entry passage 112 and the horizontally disposed passage 114 of reduced diameter which connects to the upper end of the defoaming chamber, as at 122. The lower portion of the defoaming chamber 106 is connected to the auxiliary chamber 84 by the horizontally disposed passage 116 and such fluid connection assures that the liquid blood level within said defoaming chamber 106 will be the same as that within the auxiliary chamber 84. The maintenance of the liquid blood level within the defoaming chamber 106 permits ready separation of liquid blood and foam entering through the passage 114. Excess foam which floats on the surface of the liquid blood is removed from the defoaming chamber by means of the foam vent 118 positioned adjacent the upper extremity of said chamber 106 and the diagonally disposed and downwardly directed foam vent passage 120. The other end of the foam vent passage connects directly to the saline passage 92 and permits removal of foam when said saline passage 92 is sealed off from the chamber 84 by action of the valve plug disposed in the seat 90.

In order to assure equalization between the rates of venous blood withdrawal from, and oxygenated blood return to, the source or subject 10 an automatic control system is provided to adjust the speed of the oxygenated blood pump 66 in accordance with the amount of blood entering the auxiliary blood chamber via the passageways 100 and 112. In operation of the unit the recirculating pump 60 runs at a constant optimum rate and thus pumps a constant amount over the screens in the oxygenating unit 24 at all times and oxygenated blood overflows from said unit and is collected in the auxiliary chamber 84. When the automatic control is in operation blood flowing into the chamber 84 via the passageways 100 and 112 will attempt to raise the liquid blood level therein. The automatic control is responsive to the blood level within the chamber 84 and controls the speed of the oxygenated blood pump 66 so as to maintain a rate such that the overflow from the oxygenating unit will maintain the blood level within the chamber 84 constant. In this manner the oxygenated blood pump 66 will always return to the subject or source 10 the same amount of blood that is being withdrawn therefrom. The details of the control will now be described.

As mentioned earlier, there is provided a flat plate member 94 embedded within the dielectric sidewall of the auxiliary blood receiving chamber 84. The plate 94 serves as one electrode of a condenser with the blood contained within the chamber 84 serving as the other electrode and the portion of the casing disposed between said plate and the collected blood serving as a dielectric medium. The capacitance of this condenser is determined by the level of blood contained within the chamber 84 and thus provides a variable capacitance that is directly responsive to blood volume.

Figure 2:
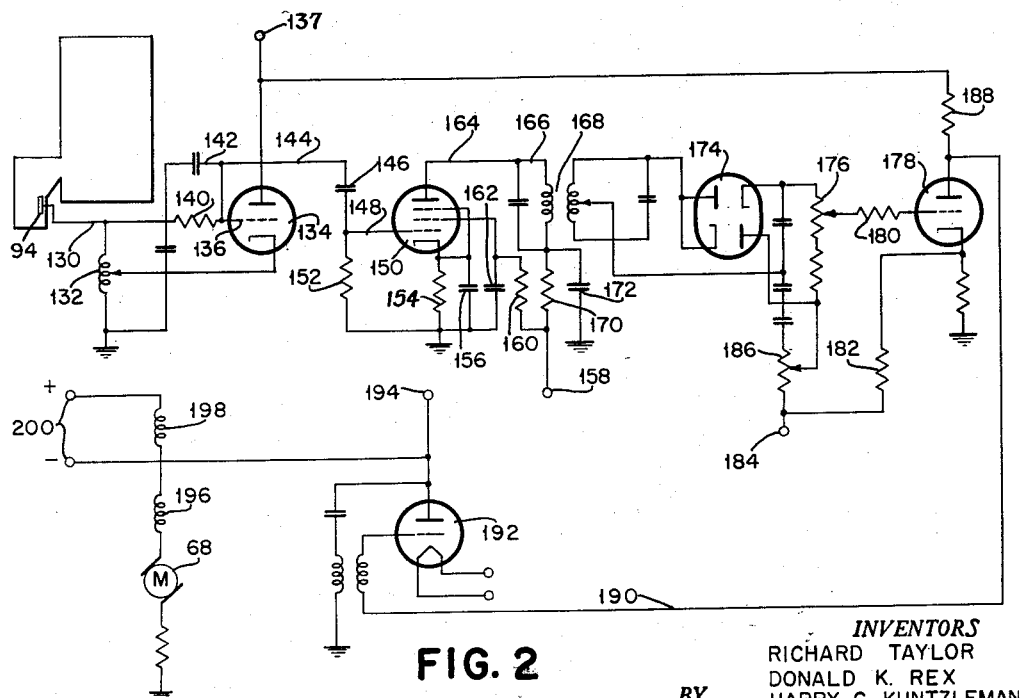
Fig. 2 is a circuit diagram of an automatic level control circuit adapted to continually maintain equalization of the rates of venous blood withdrawal and oxygenated blood return to the subject or source thereof.

Fig. 2 illustrates, by way of example, the details of the presently preferred electrical circuit adapted to control the speed of the oxygenated blood pump motor 68 in response to the level of blood contained within the chamber 84. As there illustrated, the metal plate 94 is connected by a lead 130 to the tank circuit 132 of a conventional Hartley type oscillator. The tank circuit 132 is connected to the grid 136 of the oscillator tube 134 through a resistor 140 bypassed by a capacitor 142. The plate of the oscillator tube 134 is directly connected to a suitable source of D. C. potential 137. The oscillator circuit is arranged so that the frequency of the output signal thereof is determined by the capacitance of the above-described condenser which includes as one electrode thereof the plate 94. As the blood level within the chamber 84 varies, the area of one of the plates of this condenser varies, thereby changing the value of the capacitance in the oscillator circuit and effecting a change in the output frequency of the oscillator.

The output of the oscillator is applied by means of a lead 144 to the control grid 148 of an amplifier tube 150 through a coupling condenser 146. The control grid 148 of the tube 150 is biased from the ground by resistor 152. The suppressor grid and cathode of the tube 150 are connected to ground through a resistor 154 suitably bypassed by a capacitor 156. The screen grid of the tube 150 is connected to a suitable positive D. C. potential source 158 through a resistor 160 and is also bypassed to ground through a capacitor 162.

The output of the amplifier tube 150 is connected by a lead 164 to the primary circuit 166 of a tuned intermediate frequency transformer 168 which serves as a tuned input circuit for a conventional detector-doubler stage. The plate of the amplifier tube 150 is connected through said primary circuit 166 to the potential source 158 through a resistor 170, bypassed by a capacitor 172.

The detector-doubler stage employs a dual diode 174 which serves to rectify the amplified voltage output of the oscillator tube 150. The detector-doubler stage provides a direct current output having an amplitude that is in direct proportion to the input frequency and hence to the amount of blood contained within the auxiliary chamber 84.

The direct current output of the detector-doubler stage is taken from across a resistor 176 and is used to bias the control grid of amplifier tube 178 through a resistor 180. The cathode of the amplifier tube 178 is biased at a suitable negative potential by means of a voltage divider network including the resistor 182 connected to a suitable source of negative potential 184. Bias for the detector tube output resistor 176 is also obtained from said negative potential 184 through a potentiometer 186. The plate of the amplifier tube 178 is connected to a suitable D. C. source such as 136 through the plate load resistor 188.

The output of the amplifier tube 178 is connected by means of a lead 190 directly to the grid of a thyratron motor control tube 192. The plate of thyratron control tube 192 is directly connected to a suitable source of A. C. potential 194 and to the armature 196 of the arterial pump motor 68. The field winding 198 is connected to a suitable source of D. C. potential designated 200.

As will be noted from the drawing, the use of A. C. on the plate and a D. C. control voltage with a superimposed leading A. C. voltage on the grid causes the thyratron tube to act as a half-wave rectifier. Pulsating direct current thus drives the oxygenated blood pump motor 68 with the result that its top speed would be somewhat less than would be the case if the D. C. line voltage were applied directly to the armature and series field. The armature and series field are thus connected in series with the thyratron cathode to ground. This arrangement constitutes a small servo loop since it acts to hold the motor at constant speed irrespective of changes in load.

In the operation of the circuit, as the blood level within the chamber 84 rises, the output of the detector-doubler stage decreases, serving to drive the grid of the control tube 178 more negative. The driving of the grid of control tube 178 more negative effects an increase in the plate voltage thereof, which in turn raises the grid voltage of the motor control thyratron 192. The thyratron 192 thus conducts more heavily and the increase in current through the oxygenated blood pump motor 68 serves to increase the speed of said motor 68 and to return the blood level within the chamber 84 to its normal position. Conversely, as the blood level within the chamber 84 falls, the output of the detector stage rises. This increase in voltage appears on the control grid of the tube 178 and effects a corresponding decrease in the plate voltage thereof. The decrease in plate voltage of the tube 178 effects a decrease in the voltage on the grid of the motor control thyratron 192 and a consequent lessening of current through that tube. The lessening of current through the thyratron motor control tube 192 effects a concomitant lessening of current flow through the artery pump motor 68 and a consequent decrease in speed thereof. This decrease in speed decreases the amount of blood being removed from the oxygenating unit 24 and permits a greater overflow therefrom to effect a rise in the level of blood within the chamber 84.

In the preferred embodiment of the invention there is also provided an additional control circuit to protect against the failure of the above-described level control circuit and to automatically turn off the oxygenated blood pump 34 in the event that the blood disposed within either the oxygenating unit 24 or the auxiliary blood chamber 20 falls below a predetermined lower level.

Fig. 10 illustrates, by way of example, the details of the presently preferred electrical circuit adapted to stop the oxygenated blood pump motor 68 and to provide an attention arresting warning in the form of a buzzer and a warning light to the operator of the machine in response to a drop in the level of blood within either the oxygenating unit 24 or the auxiliary blood chamber 20 below a predetermined level. As illustrated in Fig. 10, there is provided a first metal plate 201 embedded within the dielectric sidewall of the auxiliary blood receiving chamber. A second metal plate 202 is embedded within the dielectric sidewall of the blood oxygenating unit 24. The plates 201 and 202 each serve as one electrode of a condenser with the blood disposed within the auxiliary blood chamber 20 and the blood oxygenating unit 24 respectively serving as the other electrodes and portion of the casings disposed between said plates and the collected blood serving as the respective dielectric media. The capacitance of these condensers is determined by the level of the blood contained within each of the auxiliary blood chamber 20 and the blood oxygenating unit 24 and thus provide two variable capacitances that are directly responsive to the blood volume within said respective units.

The plates 201 and 202 are positioned so that the normal operating level of the blood in both the auxiliary blood chamber 20 and the blood oxygenating unit 24 is disposed above the upper edge of said plates.

As shown in Fig. 10 the metal plates 201 and 202 are commonly connected by a lead 204 to the tank circuit 206 of a conventional Hartley type oscillator. The tank circuit 206 is connected to the grid 208 of the oscillator tube 210 through a resistor 212 bypassed by a capacitor 214. The plate 216 of the oscillator tube 210 is connected to a suitable source of D. C. potential 218. The oscillator circuit is arranged so that the frequency of the output signal thereof is determined by the capacitance of either or both of the above-described condensers which include as one electrode respectively thereof the plates 201 and 202.

The output of the oscillator is applied by means of a lead 220 to the control grid 222 of an amplifier tube 224 through a coupling condenser 226. The control grid 222 is biased from ground by the resistor 228. The suppressor grid and cathode of the tube 224 are connected to ground through a resistor 230 suitably bypassed by a capacitor 232. The screen grid 234 is connected to a suitable positive D. C. potential 236 through a resistor 238 and is also bypassed to ground through a capacitor 240.

The plate 242 of the amplifier tube 224 is directly connected to the primary circuit 244 of a tuned intermediate frequency transformer 246 which serves as a tuned input circuit for a conventional detector-doubler stage. The plate 242 of the amplifier tube 224 is connected through said primary circuit 244 to the potential source 236 through a resistor 248.

The detector-doubler stage employs a dual diode 250 and serves to rectify the output voltage of the oscillator 210. The detector-doubler stage provides a direct current output that is in direct proportion to the input frequency and hence to the level of blood contained within either the auxiliary blood receiving chamber 20 or the venous blood oxygenating unit 24.

The direct current output of the detector-doubler stage is taken from across a resistor 252 and is applied through a resistor 254 to the control grid 256 of a control triode 260. The control triode 260 is normally biased so that the tube is non-conducting when the level of blood disposed within the auxiliary blood receiving chamber 20 and the blood oxygenating unit 24 are above the plates 201 and 202. The plate 262 of the control triode 260 is connected to a suitable direct current source 264 through a plurality of relay energizing coils 266, 268 and 270.

In the operation of the above-described circuit, as the blood level within either the auxiliary blood chamber 20 or the blood oxygenating unit 24 falls below its normal operating point the capacitance of the system decreases. The decrease in capacitance raises the output frequency of the oscillator tube 210 which in turn increases the direct current output of the detector-doubler stage 250. The increase in the output of the detector-doubler stage 250 drives the control grid 256 of the control triode 260 more positive and causes said tube to conduct. The increase in current through the control tube 260 resulting therefrom effects an energization of the relay coils 266, 268 and 270. Energization of the relay coil 266 results in actuation of a set of relay contacts which serve to open the circuit to the armature and series field of the oxygenated blood pump motor 68 as well as the connecting of both sides of the armature field to ground. The above action effected by energization of the relay coil 266 results in a rapid stopping of the oxygenating blood pump motor 68. Energization of the relay coils 268 and 270 results in closure of relay contacts suitably disposed in auxiliary circuits to provide attention arresting warnings to the operator of the machine such as a buzzer and a flashing warning light.

In accordance with the provisions of the patent statutes, we have herein described the principle of operation of this invention, together with the elements which we now consider to constitute a workable embodiment thereof, but we desire to have it understood that the structure disclosed is only illustrative and the invention can be carried out by other means. Also, while it is designed to use the various features and elements in the combinations and relations described, some of these may be altered and modified without interfering with the more general results outlined.

Having thus described our invention, we claim:

1. A blood pumping system for extracorporeal circulation devices having a blood oxygenating unit shaped to provide a reservoir of predetermined capacity for oxygenated blood comprising blood receiving means positioned to receive all oxygenated blood from said oxygenating unit in excess of said predetermined capacity thereof and all of the venous blood from a source thereof, a first pump for pumping blood from said blood receiving means into said oxygenating unit and a second pump for withdrawing oxygenated blood from said oxygenating unit in return to the source thereof.

2. The system as set forth in claim 1 including first sensing means associated with said blood receiving means and responsive to the level of the blood therein for providing a first electrical indication indicative of departure of the level of blood from a predetermined desired level and means responsive to said first electrical indication for controlling the speed of said second pump to maintain the level of blood within said blood receiving chamber at a predetermined desired level.

3. The system as set forth in claim 1 including second sensing means associated with both said blood oxygenating unit and said blood receiving means and responsive to the levels of blood therein for providing a second electrical indication indicative of a minimum level of blood in either said blood oxygenating unit or in said blood receiving means and means responsive to said second electrical indication for stopping said second pump to permit an increase in blood level.

4. A blood pumping system for extracorporeal circulation devices having a blood oxygenating unit shaped to provide a reservoir of predetermined capacity for oxygenated blood comprising first blood receiving means positioned to receive all oxygenated blood from said oxygenating unit in excess of the predetermined capacity and venous blood from a source thereof, second blood receiving means positioned to receive mixed venous blood and blood froth from the source thereof, means connecting said first and second blood receiving means for permitting liquid blood transferal from said second to said first blood receiving means, a first pump for pumping blood from said first blood receiving means into said oxygenating unit and a second pump for withdrawing oxygenated blood from said oxygenating unit in return to the source thereof.

References Cited in the file of this patent

UNITED STATES PATENTS 2,705,493  Malmros et al. ---------- Apr. 5, 1955

OTHER REFERENCES

Clowes et al.: Surgery, vol. 36, No. 3, September 1954, pp. 557–579 (p. 560 relied on).